(12) United States Patent
Bindingnavale Ranga

(10) Patent No.: US 9,815,548 B2
(45) Date of Patent: Nov. 14, 2017

(54) COAXIAL DUAL REDUNDANT HYDRAULIC ACTUATOR SYSTEM

(71) Applicant: Krishna Kumar Bindingnavale Ranga, Bangalore (IN)

(72) Inventor: Krishna Kumar Bindingnavale Ranga, Bangalore (IN)

(73) Assignee: KRISHNA KUMAR BINDINGNAVALE RANGA, Karnataka (IN)

( * ) Notice: Subject to any disclaimer, the term of this patent is extended or adjusted under 35 U.S.C. 154(b) by 438 days.

(21) Appl. No.: 14/513,481

(22) Filed: Oct. 14, 2014

(65) Prior Publication Data

US 2015/0114215 A1    Apr. 30, 2015

(30) Foreign Application Priority Data

Oct. 25, 2013    (IN) ............................ 1810/CHE/2013

(51) Int. Cl.
| | | |
|---|---|---|
| *F15B 15/14* | (2006.01) | |
| *B64C 13/42* | (2006.01) | |
| *F15B 20/00* | (2006.01) | |

(52) U.S. Cl.
CPC ............ *B64C 13/42* (2013.01); *F15B 15/149* (2013.01); *F15B 15/1457* (2013.01); *F15B 20/004* (2013.01); *F15B 2211/8757* (2013.01); *Y02T 50/44* (2013.01)

(58) Field of Classification Search
CPC .. F15B 15/1457; F15B 20/004; F15B 15/149; B64C 13/42
See application file for complete search history.

(56) References Cited

U.S. PATENT DOCUMENTS 7,337,885 B2 *    3/2008   Stow ................... F15B 15/1409
                                                    188/289

* cited by examiner

*Primary Examiner* — Logan Kraft
*Assistant Examiner* — Abiy Teka
(74) *Attorney, Agent, or Firm* — Barry Choobin; Patent 360 LLC

(57) ABSTRACT

The various embodiments herein provide a coaxial hydraulic actuator assembly for an aircraft hydraulic system for providing the dual redundancy operations in normal and emergency operations. The embodiments herein adopt a coaxial hydraulic cylinder based actuator system comprising a conventional fixed cylinder with a moving piston actuator. The fixed cylinder with a moving piston actuator is located in a first region. The fixed cylinder with the moving piston actuator is manufactured in tandem with a moving cylinder with fixed piston actuator. The moving cylinder with a fixed piston actuator is located in a second region. The fixed piston actuator in the second region is also referred to as actuation rod. Further, the coaxial hydraulic cylinder based actuator system comprises a first adapter and a first cap for the first region. Similarly, a second adapter and a second cap are provided for the second region.

8 Claims, 4 Drawing Sheets

COAXIAL DUAL REDUNDANT HYDRAULIC ACTUATOR SYSTEM

CROSS REFERENCE TO RELATED APPLICATIONS

This patent application claims the priority of the Indian Provisional Patent Application No. 1810/CHE/2013 filed on Apr. 25, 2013, and postdated to Oct. 25, 2013 with the title "A Coaxial Dual Redundant Hydraulic Actuator", and the content of which is incorporated in entirety by reference herein.

BACKGROUND

Technical Field

The embodiments herein generally relates hydraulic actuators used in critical services such as those that are in aircraft systems. The embodiments herein more particularly relates to a hydraulic actuator with dual coaxial chambers.

Description of the Related Art

Generally any critical hydraulic system requires a minimum of dual redundancy in the hydraulic systems. The dual redundancy is in the form of a normal hydraulic system for majority of the operation and an emergency hydraulic system in the event of failure of the normal hydraulic system. This requires two independent hydraulic actuators for each function which increases system weight and size. These hydraulic actuators comprise a simple moving piston fixed cylinder assembly. The end of the actuator is usually connected to a tie rod to produce the desired result. This requires two independent hydraulic actuators for each function.

According to the prior arts, in the aerospace systems, the space and weight constraints make an introduction of two independent side by side cylinders undesirable. A solution with a single hydraulic actuator performing the dual operations has not been developed.

Hence, there is a need for a single and improved hydraulic system for performing the dual redundancy operations in normal and emergency conditions. Also, there is a need for a compact and reliable hydraulic system for overcoming the space and weight constraints as per the existing limitations.

OBJECTIVES OF THE EMBODIMENTS

The primary object of the embodiments herein is to provide a single and improved hydraulic system for performing dual redundancy operations in normal and emergency conditions.

Another object of the embodiments herein is to provide a coaxial dual redundant hydraulic actuator for the aircraft up-locks.

Yet another object of the embodiments herein is to provide a compact hydraulic system with to individual actuators operating in tandem, and reducing space and weight requirements.

These and other objects and advantages of the embodiments herein will become readily apparent from the following detailed description taken in conjunction with the accompanying drawings.

SUMMARY

The various embodiments herein provide a coaxial hydraulic actuator assembly for an aircraft hydraulic system for performing the dual redundancy operations in normal and emergency operations. The coaxial hydraulic actuator system comprises a hydraulic body, a fixed or stationary cylinder with a moving piston, a moving cylinder, an actuation rod, a first adapter covered by a first cap and a second adapter covered by a second cap. The hydraulic both is a manifold for encasing a plurality of hydraulic actuator assembly components. The fixed cylinder with a moving piston is located in the first region and the moving cylinder is located in a second region. The actuation rod is configured for transmitting force and motion from the first region to the second region. The first adapter and the first cap are used for receiving or feeding a hydraulic fluid into the first region. The second adapter and the second cap are provided for receiving or feeding the hydraulic fluid into the second region. The fixed cylinder with the moving piston is positioned in tandem with the moving cylinder with the actuation rod. The hydraulic fluid is used for operating the cylinders and pistons.

According to one embodiment herein, the hydraulic fluid is supplied to the first region during normal operating conditions, and wherein the hydraulic fluid is supplied to the second region during emergency conditions.

According to one embodiment herein, the actuation rod is fixed to the moving cylinder in the second region, and wherein the actuation rod functions as a fixed piston.

According to one embodiment herein, the system further comprises a piston ring and a first O-ring on the outer surface of the moving piston and the Inner surface of the moving cylinder, and wherein the rings are provided for sealing the cylinder and avoiding any leakage of the hydraulic fluid from the first region.

According to one embodiment herein, the system further comprises a second O-ring configured to block the leakage of the hydraulic fluid from the second region.

According to one embodiment herein, the actuation rod is adopted to transmit the force exerted by the moving ing piston in the first region to the moving cylinder in second region, during normal operating conditions.

According to one embodiment herein, the system further comprises a cavity between the inner surface of the moving cylinder and the outer surface of the actuation rod, and wherein the cavity facilitates the flow of the hydraulic fluid through the moving cylinder, during emergency conditions.

According to one embodiment herein, the actuation rod allows the passage of the hydraulic fluid through the cavity formed by the actuation rod and the moving cylinder, and wherein the shape of the actuation rod pressurizes the hydraulic fluid for creating motion of the moving cylinder in the second region.

The embodiments herein provide a method for operating the coaxial hydraulic actuator assembly in normal operating conditions. The method comprises comprising the steps of supplying the pressurized hydraulic fluid to the fixed cylinder in the first region. A force is exerted on the moving piston of the first region through the pressurized hydraulic fluid. The force exerted cm the moving piston is transferred to the actuation rod. Due to the force exerted on the actuation rod, the moving cylinder is forced to move forward in the second region.

According to one embodiment herein, the hydraulic fluid is supplied to the fixed cylinder through the first adapter and the first cap. The first adapter is configured to compress the hydraulic fluid and the compressed hydraulic fluid exerts force on the moving piston.

The embodiments herein provide a method for operating the coaxial hydraulic actuator assembly in emergency operating conditions. The method comprises steps of supplying the pressurized hydraulic fluid to the moving cylinder in the second region. The hydraulic fluid passes through a cavity formed by the inner surface of the moving cylinder and the outer surface of the actuation rod. A force is exerted on the moving cylinder through the pressurized hydraulic fluid. The motion of the moving cylinder is caused, due to the force exerted on the moving cylinder.

According to one embodiment herein, the hydraulic fluid is supplied to the moving cylinder through the second adapter and the second cap. The force of the pressurized hydraulic fluid directly moves the moving cylinder in the second region.

The embodiments herein provide a coaxial hydraulic actuator assembly for an aircraft hydraulic system for performing the dual redundancy operations in normal and emergency operations. The embodiments herein adopt a coaxial hydraulic cylinder based actuator system comprising a conventional fixed cylinder with a moving piston actuator. The fixed cylinder with a moving piston actuator is located in first region. The fixed cylinder with the moving piston actuator is manufactured in tandem with a moving cylinder with a fixed piston actuator. The moving cylinder with a fixed piston actuator is located in a second region. The fixed piston actuator in the second region is also referred to as actuation rod. Further, the coaxial hydraulic cylinder based actuator system comprises a first adapter and a first cap for the first region. Similarly, a second adapter and a second cap are provided for the second region.

According to one embodiment herein, a method of operating the coaxial hydraulic actuator assembly in normal conditions is provided. Under normal operating conditions, a pressurized hydraulic fluid is supplied to the fixed cylinder in the first region. The pressurized hydraulic fluid exerts a force on the moving piston causing to move and actuate the actuation rod in the second region. The force and motion from the first region is transmitted to the second region by means of the actuation rod. The configuration of two individual actuators operating in tandem reduces the space and weight requirements in an aircraft.

According to one embodiment herein, a method of operating the coaxial hydraulic actuator assembly under emergency conditions is provided. Under emergency conditions, a pressurized hydraulic fluid is supplied to the moving cylinder in the second region. The pressurized hydraulic fluid is supplied, through the second adapter and the second cap. The actuation rod in the second region is coupled with the moving cylinder. Further, the construction of the actuation rod is in such a manner to allow the passage of a fluid through a space formed by the inner surface of the moving cylinder and the outer surface of the actuation rod. The force of the pressurized hydraulic fluid directly moves the moving cylinder of the second region and performs the required action.

These and other aspects of the embodiments herein will be letter appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
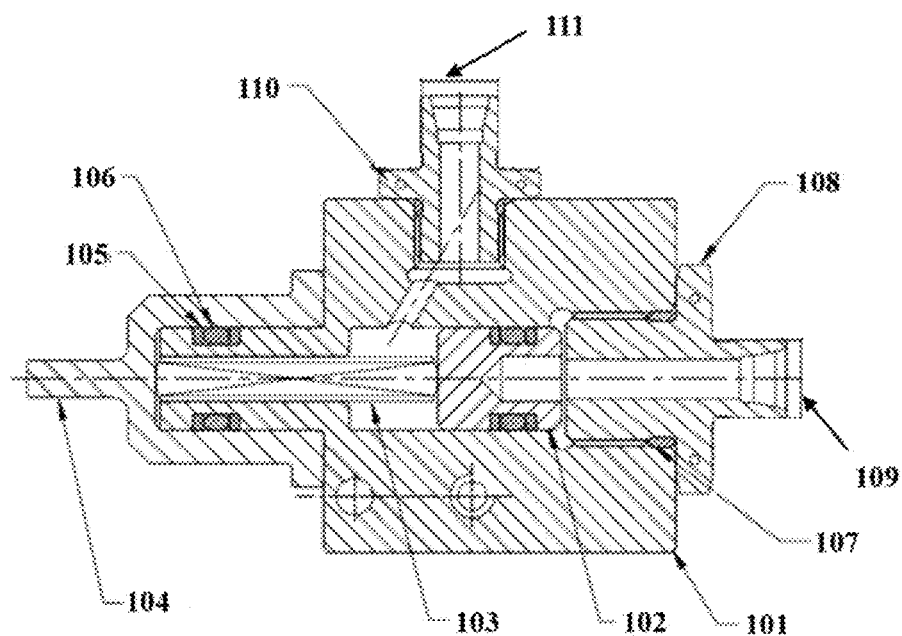
FIG. 1 illustrates a cross sectional view of the coaxial hydraulic actuator assembly for aircraft up-locks mechanisms, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the embodiments herein provide a coaxial hydraulic actuator assembly for an aircraft hydraulic system for performing the dual redundancy operations in normal and emergency operations. The coaxial hydraulic actuator system comprises a hydraulic body, a fixed or stationary cylinder with a moving piston, a in moving cylinder, an actuation rod, a first adapter covered by a first cap and a second adapter covered by a second cap. The hydraulic body is a manifold for encasing a plurality of hydraulic actuator assembly components. The fixed cylinder with a moving piston is located in a first region and the moving cylinder is located in a second region. The actuation rod is configured for transmitting force and motion from the first region to the second region. The first adapter and the first cap are used for receiving or feeding a hydraulic fluid into the first region. The second adapter and the second cap are provided for receiving or feeding the hydraulic fluid into the second region. The fixed cylinder with the moving piston is positioned in tandem with the moving cylinder with the actuation rod. The hydraulic fluid is used for operating the cylinders and pistons.

According to one embodiment herein, the hydraulic fluid is supplied to the first region during normal operating conditions, and wherein the hydraulic fluid is supplied to the second region during emergency conditions.

According to one embodiment herein, the actuation rod is fixed to the moving cylinder in the second region, and wherein the actuation rod functions as a fixed piston.

According to one embodiment herein, the system further comprises a piston ring and a first O-ring on the outer surface of the moving piston and the inner surface of the moving cylinder, and wherein the rings are provided for sealing the cylinder and avoiding any leakage of the hydraulic fluid from the first region.

According to one embodiment herein, the system further comprises a second O-ring configured to block the leakage of the hydraulic fluid from the second region.

According to one embodiment herein, the actuation rod is adopted to transmit the force exerted by the moving piston in the first region to the moving cylinder in second region, during normal operating conditions.

According to one embodiment herein, the system further comprises a cavity between the inner surface of the moving cylinder and the outer surface of the actuation rod, and wherein the cavity facilitates the flow of the hydraulic fluid through the moving cylinder, during emergency conditions.

According to one embodiment herein, the actuation rod allows the passage of the hydraulic thud through the cavity formed by the actuation rod and the moving cylinder, and wherein the shape of the actuation rod pressurizes the hydraulic fluid for creating motion of the moving cylinder in the second region.

The embodiments herein provide a method for operating the coaxial hydraulic actuator assembly in normal operating conditions. The method comprises comprising the steps of supplying the pressurized hydraulic fluid to the fixed cylinder in the first region. A force is exerted on the moving piston of the first region through the pressurized hydraulic fluid. The force exerted on the moving piston is transferred to the actuation rod. Due to the force exerted on the actuation rod, the moving cylinder is forced to move forward in the second region.

According to one embodiment herein, the hydraulic fluid is supplied to the fixed cylinder through the first adapter and the first cap. The first adapter is configured to compress the hydraulic fluid and the compressed hydraulic fluid exerts force on the moving piston.

The embodiments herein provide a method for operating the coaxial hydraulic actuator assembly in emergency operating conditions. The method comprises steps of supplying the pressurized hydraulic fluid to the moving cylinder in the second region. The hydraulic fluid passes through a cavity formed by the inner surface of the moving cylinder and the outer surface of the actuation rod. A force is exerted on the moving cylinder through the pressurized hydraulic fluid. The motion of the moving cylinder is caused, due to the force exerted on the moving cylinder.

According to one embodiment herein, the hydraulic fluid is supplied to the moving cylinder through the second adapter and the second cap. The force of the pressurized hydraulic fluid directly moves the moving cylinder in the second region.

The embodiments herein provide a coaxial hydraulic actuator assembly for an aircraft hydraulic system for performing the dual redundancy operations in normal and emergency operations. The embodiments herein adopt a coaxial hydraulic cylinder based actuator system comprising a conventional fixed cylinder with a moving piston actuator. The fixed cylinder with a moving piston actuator is located in a first region. The fixed cylinder with the moving piston actuator is manufactured in tandem with a moving cylinder with fixed piston actuator. The moving cylinder with a fixed piston actuator is located in a second region. The fixed piston actuator in the second region is also referred to as actuation rod. Further, the coaxial hydraulic cylinder based actuator system comprises a first adapter and a first cap for the first region. Similarly, a second adapter and a second cap are provided for the second region.

According to one embodiment herein, a method of operating the coaxial hydraulic actuator assembly in normal conditions is provided. Under normal operating conditions, a pressurized hydraulic fluid is supplied to the fixed cylinder in the first region. The pressurized hydraulic fluid exerts a force on the moving piston causing to move and actuate the actuation rod in the second region. The three and motion from the first region is transmitted to the second region by means of the actuation rod. The configuration of two individual actuators operating in tandem reduces space and weight requirement in an aircraft.

According to one embodiment herein, a method of operating the coaxial hydraulic actuator assembly under emergency conditions is provided. Under emergency conditions, a pressurized hydraulic fluid is supplied to the moving cylinder in the second region. The pressurized hydraulic fluid is supplied through the second adapter and the second cap. The actuation rod in the second region is coupled with the moving cylinder. Further, the construction of the actuation rod is in a manner which allows the passage of a fluid through a space formed by the inner surface of the moving cylinder and the outer surface of the actuation rod. The force of the pressurized hydraulic fluid directly moves the moving cylinder of the second region and performs the required action.

FIG. 1 illustrates a cross sectional view of the coaxial hydraulic actuator assembly for aircraft up-locks mechanisms, according to one embodiment, herein. The coaxial hydraulic actuator comprises a hydraulic body 101, an emergency/fixed piston 102 an actuation rod 103, a moving cylinder 104, a piston ring 105, a first O-ring 106, a second O-ring 107, a first adapter 108, a second adapter 110, a first cap 109 and a second cap 111 as illustrated in the cross section of the assembly in FIG. 1. The hydraulic body 101 is a manifold and forms the skeleton of the coaxial hydraulic actuator to which all other components are assembled. The emergency piston 102 is a moving piston assembled inside a fixed cylinder in the hydraulic body 101, with provisions for assembling a piston ring 1 and O-ring 106. The actuation rod 103 is used to transmit the force exerted by the emergency piston 102 to the moving cylinder 104. The piston ring 105 and the first O-ring 106 is provided on the outer surface of the emergency piston 102 and the inner surface of the moving cylinder 104 for sealing and avoiding any leakage of hydraulic fluid. Similarly, the second O ring 107 blocks the leakage of the hydraulic fluid from the first region. The first adapter 108 and the second adapter 110 are provided along with a first cap 109 and a second cap 11 respectively, through which hydraulic fluid is supplied to the actuator.

Figure 2:
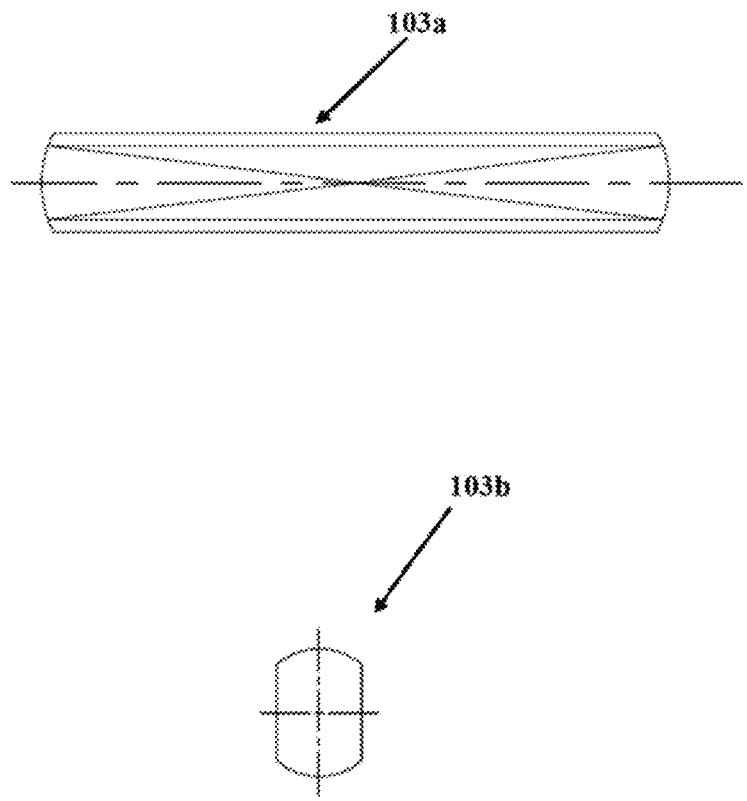
FIG. 2 illustrates side and cross sectional view for an actuation rod of a coaxial hydraulic actuator assembly, according to one embodiment herein.

FIG. 2 illustrates side and cross sectional view for an actuation rod of a coaxial hydraulic actuator assembly, according to one embodiment herein. The actuator assembly is present in a second region of the coaxial hydraulic actuator assembly. The actuation rod is fixed to moving cylinder and functions as a piston in the second region, and thus also called as fixed piston. A side view 103a and a cross sectional view 103b of the actuation rod is displayed. The actuation rod when fixed with the moving cylinder creates a cavity. Through this cavity, the hydraulic fluid flows and directly moves the moving cylinder forward.

Figure 3:
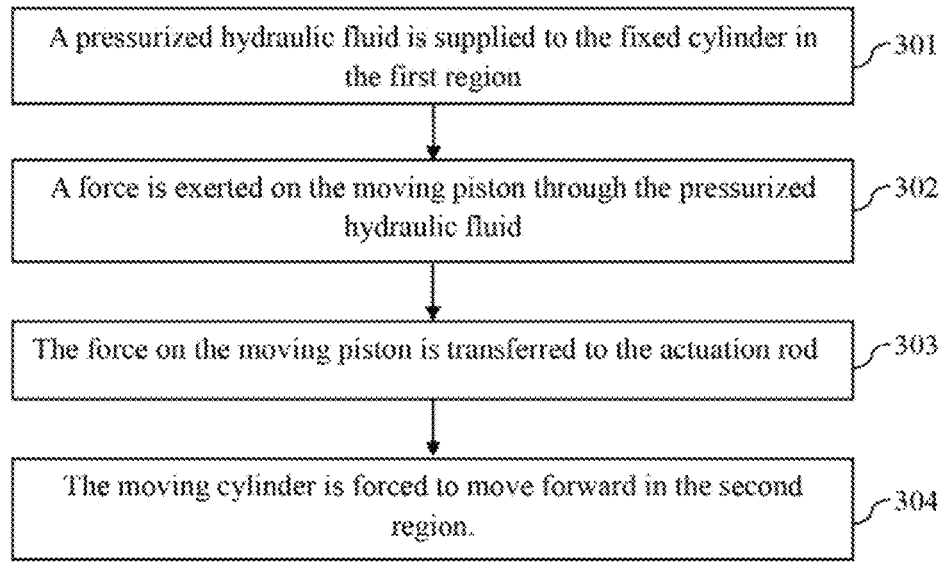
FIG. 3 illustrates a flowchart indicating the steps involved in a method for operating the coaxial hydraulic actuator assembly in normal operating conditions, according to one embodiment herein.

FIG. 3 illustrates a flowchart indicating the steps involved in a method for operating the coaxial hydraulic actuator assembly in normal operating conditions, according to one embodiment herein. During normal operating conditions, hydraulic fluid is supplied to the actuator through the first adapter (301). The hydraulic fluid flows into the fixed cylinder. Then, the first adapter is pushed inside, and the first adaptor is configured to start compressing the hydraulic fluid. The compressed hydraulic fluid in turn starts exerting force on the moving piston (302). The force on the moving piston is transferred to the actuation rod (303). The moving piston actuates the actuation rod which in turn makes the moving cylinder to move forward in the second region (304).

Figure 4:
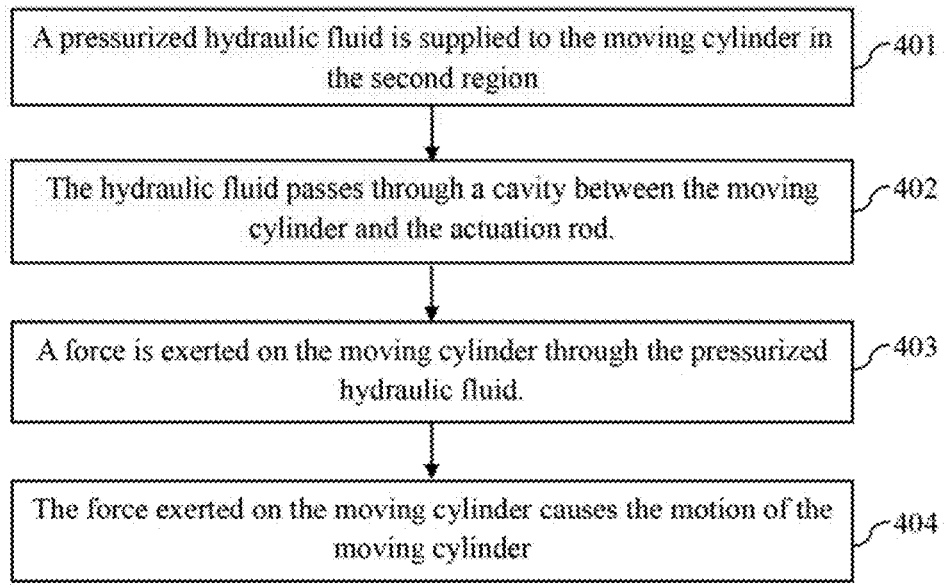
FIG. 4 illustrates a flowchart indicating the steps involved in a method for operating the coaxial hydraulic actuator assembly in emergency operating conditions, according to one embodiment herein.

FIG. 4 illustrates a flowchart indicating the steps involved in a method for operating the coaxial hydraulic actuator assembly in emergency operating conditions, according to one embodiment herein. In an emergency situation such as the malfunctioning of the normal hydraulic system, the hydraulic fluid is supplied through the second adapter into the moving cylinder (401). The hydraulic fluid enters into the moving cylinder through a cavity between the actuation rod and moving cylinder (402). The surface of the actuation rod on assembly with the hydraulic body is provided with a cavity for the hydraulic fluid to flow through to the moving cylinder. The shape of the actuation rod allows the pressurized hydraulic fluid to flow through. The pressurized hydraulic fluid exerts a force on the moving cylinder (403). The force on the moving, cylinder enables the moving cylinder to move forward in second region (404). Thus, a dual redundancy is achieved by use of a single actuation system under normal conditions and emergency conditions.

The embodiments herein facilitate a single and improved hydraulic system for performing dual redundancy operations in normal and emergency conditions. The coaxial dual redundant hydraulic actuator is mainly designed for the aircraft up-locks. The disclosed system is a compact hydraulic assembly with two individual actuators operating tandem, for reducing the space and weight requirements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

It is also to be understood that the following claims are intended to cover all of the generic and specific features of the embodiments described herein and all the statements of the scope of the embodiments which as a matter of language might be said to fall there between.

What is claimed is:

1. A coaxial hydraulic actuator assembly for an aircraft hydraulic system, said assembly comprising:
   a hydraulic body;
   a fixed cylinder with a moving piston located in a first region of the hydraulic body;
   a moving cylinder located in a second region of the hydraulic body;
   an actuation rod for transmitting force and motion from the first region to the second region, said actuation rod operatively coupled to the moving cylinder such that a cavity is created between an inner surface of the moving cylinder and an outer surface of the actuation rod to facilitate movement of a hydraulic fluid, said actuation rod, by virtue of shape thereof, configured to pressurize the hydraulic fluid flowing through the moving cylinder;
   a first adapter and a first cap for feeding a hydraulic fluid into the first region;
   a second adapter and a second cap for feeding a hydraulic fluid into the second region; and
   wherein the fixed cylinder with the moving piston is positioned in tandem with the moving cylinder with the actuation rod, and wherein the hydraulic fluid is used for operating the fixed cylinder, the moving cylinder and the moving piston, and wherein the hydraulic fluid is supplied to the first region during normal operating conditions, and wherein the hydraulic fluid is supplied to the second region during emergency conditions.

2. The system according to claim 1, wherein the actuation rod is fixed to the moving cylinder in the second region, and wherein the actuation rod functions as a fixed piston.

3. The system according to claim 1, further comprises a piston ring and a first O-ring on an outer surface of the moving piston and inner surface of the moving cylinder, and wherein the rings are provided for sealing the cylinder and avoiding any leakage of the hydraulic fluid from the first region.

4. The system according to claim 1, further comprises a second O-ring configured to block a leakage of the hydraulic fluid from the second region.

5. The system according to claim 1, wherein the actuation rod is adapted to transmit a force exerted by the moving piston in the first region, to the moving cylinder in second region, during normal operating conditions.

6. A method for operating a coaxial hydraulic actuator assembly, said method comprising the following steps:
   supplying a pressurized hydraulic fluid to a fixed cylinder operatively coupled to a moving piston in a first region, and selectively supplying the hydraulic fluid to a moving cylinder in a second region;
   operatively coupling the fixed cylinder and the moving cylinder via an actuating rod, and configuring said actuation rod to create a cavity between an inner surface of the moving cylinder and an outer surface of the actuation rod, said cavity leading to the moving cylinder;
   exerting a force on the moving piston through the pressurized hydraulic fluid;
   transferring the force exerted on the moving piston to the actuation rod;
   and forcing the moving cylinder to move forward in the second region, due to the force exerted on the actuation rod;
   selectively passing the hydraulic fluid through the cavity formed between the inner surface of the moving cylinder and the outer surface of the actuation rod;
   exerting a force on the moving cylinder using the pressurized hydraulic fluid flown through the cavity; and
   causing a motion of the moving cylinder, due to the force exerted on the moving cylinder.

7. The method according to claim 6, wherein the hydraulic fluid is supplied to the fixed cylinder through a first adapter and a first cap, wherein the first adapter is configured to compress the hydraulic fluid and wherein the compressed hydraulic fluid exerts force on the moving piston.

8. The method according to claim 6, wherein the hydraulic fluid is supplied to the moving cylinder through a second adapter and a second cap, wherein the force of the pressurized hydraulic fluid directly moves the moving cylinder in the second region.

\* \* \* \* \*